United States Patent [19]
Tashiro et al.

[11] 3,854,090
[45] Dec. 10, 1974

[54] BIMETAL TYPE INDICATOR

[75] Inventors: Hiroyuki Tashiro; Mikio Takeshita, both of Kariya, Japan

[73] Assignee: Nippondenso Co., Ltd., Aichi-ken, Japan

[22] Filed: Dec. 12, 1972

[21] Appl. No.: 314,457

[30] Foreign Application Priority Data
Dec. 27, 1971 Japan.................................. 46-593

[52] U.S. Cl................................. 324/106, 323/68
[51] Int. Cl............................................. G01r 5/26
[58] Field of Search........................ 324/106; 323/68

[56] References Cited
UNITED STATES PATENTS
2,991,418  7/1961  Kraft................................. 324/106
3,668,520  6/1972  Blackham......................... 324/106

Primary Examiner—Alfred E. Smith
Assistant Examiner—Ernest F. Karlsen
Attorney, Agent, or Firm—Cushman, Darby & Cushman

[57] ABSTRACT

A bimetal type indicator comprising an insulating plate provided with a plurality of projections, a gauge section carrier plate engaged with said projection, an adjustable holding member secured to said gauge section carrier plate by means of a rivet, a pointer driving bimetal element mounted on said adjustable holding member, a pointer support member fixed to said rivet and engaged with said locating projections of the insulating plate at the side of said gauge section carrier plate opposite to said insulating plate, and a pointer rotatably mounted on said pointer support member and adapted to be angularly displaced in response to the deformation of the bimetal element.

6 Claims, 3 Drawing Figures

PATENTED DEC 10 1974

3,854,090

3,854,090

BIMETAL TYPE INDICATOR

BACKGROUND OF THE INVENTION

The present invention relates to a bimetal type indicator, such as a fuel indicator for an automobile, which has an pointer adapted to be displaced by bimetal means which is deformed by heat produced in a heating wire element.

Generally, a bimetal type indicator of this type comprises an inner case made of steel material, an adjustable holding plate which carries a pointer and a bimetal element for displacing the needle, a voltage regulator, an insulating plate made of a glass fiber board for carrying electrically conductive elements for electrical circuit means, and a dial. The holding plate, the voltage regulator, the insulating plate and the dial are secured to the inner case by suitable mechanical means including lugs provided on the inner casing and adapted to be inserted into corresponding apertures in the element to be installed and thereafter bent to hold the same in the inner casing. According to this conventional arrangement, the holding plate, the insulating plate and the dial are secured in the inner casing at different positions by said mechanical means, so that it is difficult to assemble the indicator through an automatic process. Thus, a substantial labour is spent in assembling the same. Further, since the holding plate and the insulating plate occupies a substantial portion in the casing, little space is left for installing the dial so that a very difficult work is required for installing the dial. The insulating plate is secured to the inner casing by engaging lugs on the casing with corresponding holes in the plate and thereafter bending the lugs as previously described. Therefore, there is a possibility that the insulating plate is deformed when it is installed to the casing resulting in incorrect spacings between terminal lugs provided thereon. Such incorrect spacings between the terminal lugs may possibly cause disturbances to succeeding assembling operations.

In the conventional arrangement, the voltage regulator is secured to the insulating plate by spot welding the former to the terminal lugs provided on the latter, prior to the installation of the plate to the casing. Further, the pointer is previously installed rotatably on the holding plate. Therefore, dust may possibly be deposited on the contacts of the voltage regulator before it is installed on the inner casing, and the pointer may be deformed or the paint coating on the pointer is undesirably removed when the holding plate is installed on the inner casing.

Further, since various types of terminal lugs, pointers and electrically conductive plates are previously assembled and various types of sub-assemblies are transferred to the same assembly line, the process control of the assembly line becomes complicated.

SUMMARY OF THE INVENTION

The present invention has an object to eliminate the aforementioned disadvantages of the conventional arrangement.

A further object of the present invention is to provide a bimetal type indicator which can be easily assembled through an automated process.

Another object of the present invention is to provide a bimetal type indicator in which a dial can readily be installed.

Still further object of the present invention is to provide a bimetal type indicator in which an insulator plate is free from distortion and correct spacings can be ensured between electrical terminal lugs provided thereon.

A further object of the present invention is to provide a bimetal type indicator in which voltage regulator and pointer are assembled in later stages of assembling process so as to prevent them from being damaged during assembling operation.

A further object of the present invention is to provide a bimetal type indicator in which such parts that are different in shape in accordance with the type of the indicator, such as terminal lugs and pointers, are installed in later stages of assembling process, so as to facilitate the control of the assembling operation.

According to the present invention, there is provided a bimetal type indicator comprising an insulating plate provided with locator projection means, a gauge section carrier plate fixed to the locator projection means on the insulating plate, an adjustable holding plate mounted on said carrier plate by means of a rivet, pointer driving bimetal means mounted on said holding plate, a pointer support plate secured to said carrier plate by said rivet at the side opposite to said holding plate, and pointer means rotatably supported on said pointer support plate. According to the present invention, the gauge portion carrier plate, the holding plate, the pointer support plate and the pointer are mounted on the insulating plate in this order, so that the aforementioned objects can be achieved.

BRIEF DESCRIPTION OF THE DRAWINGS

The above and other objects and features of the present invention will become apparent from the following descriptions of a preferred embodiment of the present invention taking reference to the accompanying drawings; in which.

DESCRIPTION OF THE PREFERRED EMBODIMENT

Figure 1:
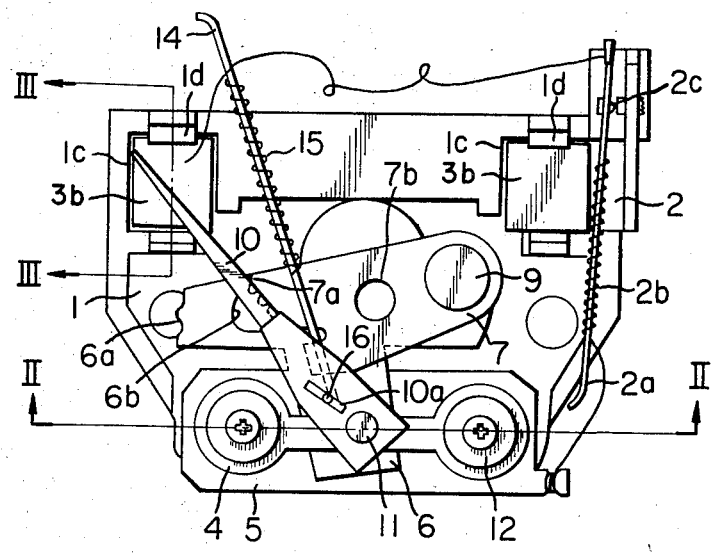
FIG. 1 is a plan view showing a bimetal type indicator in accordance with one embodiment of the present invention.
Figure 2:
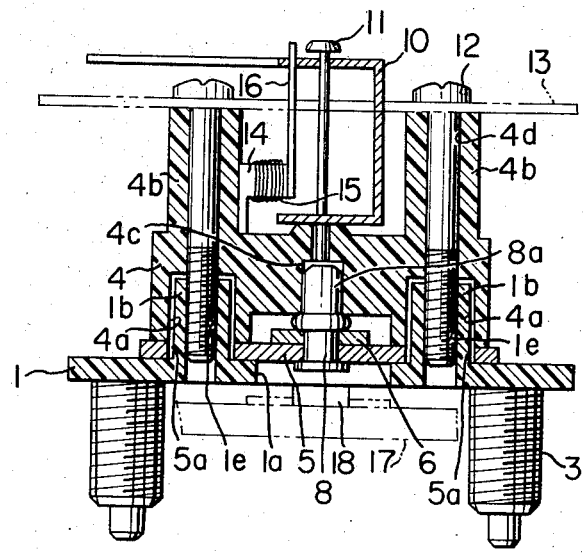
FIG. 2 is a longitudinal sectional view taken substantially along the line II-II in FIG. 1; and, FIG. 3 is a longitudinal sectional view taken substantially along the line III-III in FIG. 1.
Figure 3:
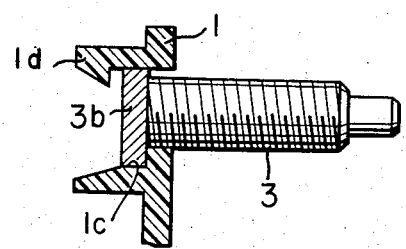

Referring now to the drawings, particularly to FIGS. 1 and 2, the illustrated indicator includes an insulating plate 1 which has a central opening 1a and a pair of locator projections 1b provided on the insulating plate 1 at the opposite sides of the central opening 1a. The reference numeral 2 designates a voltage regulator comprising a bimetal element 2a, an electrical heating wire 2b wound around the bimetal element 2a and contacts 2c which are opened and closed in response to deformation of said bimetal element 2a. The indicator further includes terminal lugs 3, each of which has a rectangular plate 3b secured to the tip end thereof as shown in FIG. 3. Each of the terminal lugs 3 is secured to the insulating plate 1 against rotation by placing the rectangular plate 3b into mating engagement with corresponding one of rectangular openings 1c formed in said insulating plate 1. As shown in FIGS. 1 and 3, the insulating plate 1 is provided with an inward projection 1d at the edge of each opening 1c so as to prevent the plate 3b from being disengaged from the opening 1c. The voltage regulator 2 is secured to one of the terminal lugs 3 by means of spot welding. The reference numeral 4 designates a pointer support plate which is made of plastic material and provided with locating recesses 4a for loose engagement with the projections 1b provided on the insulating plate 1. At the upper portion of each of the recesses 4a, there is provided a projection 4b for installing a dial 13. Between the pointer support plate 4 and the insulating plate 1, there is disposed a gauge portion carrier plate 5 which has a pair of holes 5a at the opposite sides thereof for engagement with the projections 1b on the insulating plate 1. A holding plate 6 made of a metal is pivotally mounted on the carrier plate 5 by means of a rivet 8. The plate 6 is provided with zero position adjusting gear teeth 6a and an adjusting hole 6b. The reference numeral 7 designates a bimetal holding plate which is made of a metal and provided with gear teeth 7a for adjusting swing angle. The plate 7 is further provided with a locating hole 7b which co-operates with a corresponding hole provided in the holding plate 6. As shown in FIG. 2, the rivet 8 is provided at its upper portion with a projection 8a for engagement with a recess 4c formed in the pointer support plate 4 at the central portion thereof. The bimetal holding plate 7 is pivotally mounted on the holding plate 6 by means of a rivet 9. A pointer 10 is rotatably mounted on the pointer support member 4 by means of a needle shaft 11 embedded in the member 4 at a position directly above the recess 4c. The dial 13 is secured to the needle support member 4 by a pair of screws 12 which extend through a pair of holes 4d formed in the projections 4b of the needle support member 4 into engagement with threaded holes 1e formed in the projections 1b of the insulating plate 1. The reference numeral 14 designates a pointer actuating bimetal element having a pair of metal pieces and secured at one end of one of the pieces to the bimetal holding plate 7 by means of spot welding. The other of the pieces has an electric heating wire 15 wound therearound. One end of the wire 15 wound around the bimetal element 14 is connected to the bimetal element 2a of the voltage regulator 2, and one end of the wire 2b wound around the bimetal element 2a is connected to the gauge carrier plate 5. The other end of the wire 2b is connected to the bimetal 2a of the regulator. The other end of the wire 15 wound around the bimetal element 14 is connected to the terminal lug 3 which is located at the side opposite to the voltage regulator 2. The reference numeral 16 designates a guide pin which is secured at one end by soldering to the bimetal element 14 at the piece having electric heating wire 15 wound therearound. The other end of the guide pin 16 is inserted into a slanted slot 10a formed in the pointer 10. The aforementioned assembly of parts is encased in a casing 17 which is partially shown by dotted lines in FIG. 2. The reference numeral 18 designates a earth plate which is forced into contact with the bottom end of the rivet 8 or the gauge portion carrier plate 5, so as to complete a earth circuit for the voltage regulator 2.

In assembling the indicator of the above described arrangement, the guide pin 16, the heating wire 15, the pointer actuating bimetal element 14, the bimetal holding plate 7 and the rivet 9 are previously assembled on the holding plate 6 and thereafter the assembly is mounted on the carrier plate 5 by the rivet 8. For this purpose, the holding plate 6 has the adjusting hole 6b and locating holes (not shown) and the bimetal holding plate 7 also has the locating hole 7b, the holes being utilized to locate the holding plate 6 with respect to the gauge carrier plate 5 by suitably locating the holes with respect to the holes 5a in the gauge carrier plate 5. The setting of the rivet 8 can be automatically performed. Thereafter, the holes 5a in the carrier plate 5 are brought into engagement with the locating projections 1b on the insulating plate 1 and then the pointer support member 4 is placed on the carrier plate 5 with the locating recesses 4a engaged with the locating projection 1b on the insulating plate 5. At this instance, the end 8a of the rivet 8 is pressed into the hole 4c in the pointer support member 4. Thus, the pointer support member 4 is secured to the gauge carrier plate 5 by the rivet 8 and the gauge carrier plate 5 is in turn secured to the insulating plate 1 by being interposed between the pointer support member 4 and the insulating plate 1. Thereafter, the terminal lugs 3, one having the voltage regulator 2 thereon and the other having no voltage regulator, are inserted into the rectangular holes 1c in the insulating plate 1 and secured thereto by the lug portions 1d provided on the edges of the holes 1c. Then, one end of the heating wire 2b wound on the bimetal element 2a for the voltage regulator 2 is connected to the gauge carrier plate 5, and one end of the heating wire 15 wound on the pointer actuating bimetal 14 is connected to the bimetal element 2a, the other end being connected to the terminal lug 3 which does not carry the voltage regulator. The pointer 10 is mounted on the pointer shaft 11 and the guide pin 16 is inserted into the slot 10a in the pointer 10. Thereafter, the pointer shaft 11 is pressed into the upper portion of the hole 4c in the pointer carrier member 4. Then, the screws 12 are inserted through the dial 13 and the holes 4d in the pointer carrier member 4 into the threaded holes 1e in the insulating plate 1 to secure the dial 13 on the projections 4b on the pointer carrier member 4. The sub-assembly of the indicator thus formed in then housed in the casing 17 to be mounted on an instrument panel of an automobile. The earth plate 18 provided on the casing 17 is in this position brought into contact with the bottom end of the rivet 8 or the gauge carrier plate 5 so as to complete the earth circuit for the voltage regulator 2.

Thus, in the indicator of the present invention having the construction as described above, the insulating plate 1, the gauge carrier plate 5 having the holding plate 6 secured thereto by the rivet 8, the pointer support member 4, the pointer 10 and the dial 13 are stacked in this order to form subassembly, so that the indicator can be readily and automatically assembled. According to this arrangement, there is no danger that the insulating plate 1 is deformed when it is installed in the instrument casing. It should further be noted that the terminal lugs 3 are mounted on the insulating plate 1 by bringing them into engagement with rectangular holes 1c formed in the insulating plate, so that the terminal lugs 3 can be correctly located. Further, according to the present invention, the sub-assembly of the indicator can readily be housed in the casing 17.

It should also be noted that, since the voltage regulator 2, the terminal lugs 3 and the needle 10 can be assembled after the sub-assembly is formed, it is possible to keep the contacts 2c of the voltage regulator free from dust and also the pointer free from damage. Although the terminal lugs and the pointer may be different in shape among various types of instrument, they can be assembled in the later stages of the assembling process, so that the control of the process can be remarkably simplified. Since the ground plate 18, which may be different in shape among the types of indicators, is secured to the casing, the functional parts of the indicator can be standardized for various types of indicators and thus various types of indicators can be assembled in an automatic assembling process.

Although the invention has thus been described with reference to specific arrangements of parts which are shown in the accompanying drawings, it should of course be noted that the invention is in no way limited to the details of the illustrated arrangements but various changes and modifications can be made without departing from the scope of the appended claims.

We claim:

1. A bimetal type indicator comprising:
   an insulating plate provided with locating projection means,
   a gauge section carrier plate fixed to said locating projection means on said insulating plate,
   a pointer support means fixed to said locating projection means on said gauge section carrier plate,
   a pointer means having a slot formed therein and pivotally mounted on said pointer support means by means of a pin,
   a bimetal means having an elongated portion extending into said slot,
   a bimetal holding plate, on which said bimetal means is fixed, for adjusting the range of the angular motion of said pointer means,
   a holding plate pivotally holding said bimetal holding plate at one point and pivotally mounted on said gauge section carrier plate at the other point by means of a rivet which is coaxial with said pin, and
   a dial mounted on said pointer support means, and on which at least a zero point and a full range point are calibrated, wherein said slot in said pointer means extends substantially in parallel with a tangent to an arc described by said elongated part of said bimetal means when said bimetal holding plate is pivotally moved with respect to said one point, whereby said pointer means is so adjusted to be in alignment with said zero point by rotating said holding plate with respect to said rivet and thereafter said pointer means is so adjusted to be in alignment with said full range point by rotating said bimetal holding plate with respect to said one point.

2. A bimetal type indicator as claimed in claim 1, wherein said locating projection means comprises a pair of projections, said guage section carrier plate having openings through which said pair of projections extend.

3. A bimetal type indicator as claimed in claim 1, wherein said dial is secured to said insulating plate by means of screw members extending through said dial and said pointer support means and screwed into said locating projection means.

4. A bimetal type indicator as claimed in claim 1, further comprising:
   a ground member secured to a casing of the indicator, and adapted to be electrically coupled to said gauge section carrier plate.

5. A bimetal type indicator as claimed in claim 1, further comprising:
   a pair of terminal lugs mounted on said insulating plate.

6. A bimetal type indicator as claimed in claim 5, wherein said terminal lugs extend from said insulating plate in a direction opposite to the direction in which said locating projection means extend, said terminal lugs having substantially rectangular heads, said insulating plate snugly receiving said heads of said terminal lugs.

* * * * *